No. 713,192. Patented Nov. 11, 1902.
R. AUBRY.
COFFEE FILTER.
(Application filed May 24, 1901.)
(No Model.)
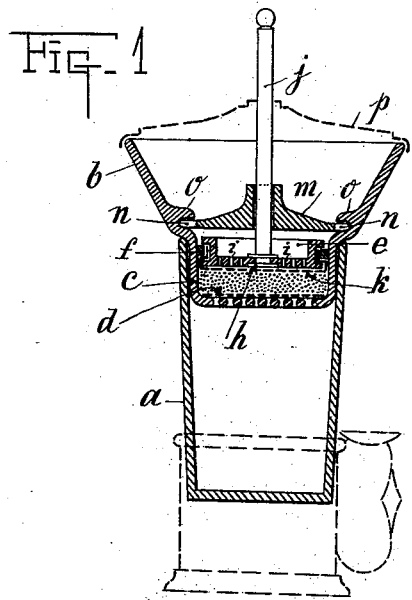
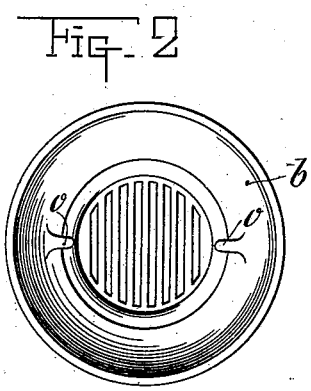
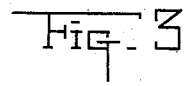
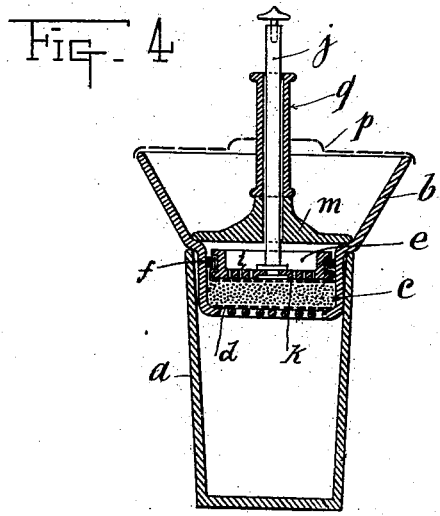
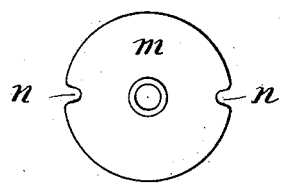
Witnesses
Inventor
Raymond Aubry

UNITED STATES PATENT OFFICE.

RAYMOND AUBRY, OF DIJON, FRANCE.

COFFEE-FILTER.

SPECIFICATION forming part of Letters Patent No. 713,192, dated November 11, 1902.

Application filed May 24, 1901. Serial No. 61,791. (No model.)

*To all whom it may concern:*

Be it known that I, RAYMOND AUBRY, a citizen of the Republic of France, and a resident of 8 Rue Bossuet, Dijon, France, have invented an Improvement in Coffee-Filters, of which the following is a specification.

This invention has for its object a new coffee-filter, whereby all nutritive elements or essence of the coffee may be abstracted.

Heretofore it has been customary to pour as much water as possible all at once on the pulverized coffee. Now a portion (about one-half) of this water goes direct through the pulverized coffee, and the other portion of the water, which percolates through with more difficulty, as the powder has swollen, abstracts only a part of the nutritive elements of the coffee. What should be done to abstract all essence of the pulverized coffee is to first wet this powder, which after swelling shall receive at several times some water kept always very hot, if not boiling, and in order to obtain this result, notwithstanding the inexperience of the person who prepares the coffee, I have devised the filter which is the object of this application and which I shall now describe with reference to the drawings.

Figure 1 is a vertical section of the filter set on a suitable receptacle; Fig. 2, a plan of the main receptacle or vessel which receives the boiling water; Fig. 3, a plan of the notched closing-plate; Fig. 4, a modification of Fig. 1.

As shown in Fig. 1, the apparatus, which may be almost entirely made of glass, is provided with a shoulder to adapt it to set on or in a glass or other receptacle $a$, the diameter of which is somewhat larger. This receptacle receives the coffee which is produced by the filter.

The apparatus is composed of three parts—viz., a receiver $b$, a piston $e$, and a plate $m$. The receiver $b$ has preferably a tapered or V-shaped upper portion, and at the bottom of the tapered portion is a cylindrical cup portion $c$, which has a slitted bottom, which is covered by a filtering-plate $d$, which effects the filtration. In said cup $c$ the ground coffee is put and is covered by a plate or piston $e$, which has a packing $f$. The upper portion of the vessel $b$ is considerably widened. Into this widened portion the boiling water is poured.

The plate or piston $e$ is preferable made of glass, having small perforations $i$ for the passage of water and a central perforation $h$ through which a rod $j$, made of bone or ivory, passes, said rod serving to raise or lower said plate or piston, which covers the pulverized coffee and which is provided with a silken bolting-cloth $k$ below. Said plate or piston is provided around its entire circumference with a groove, in which is seated a suitable ring $f$, which forms a packing and produces a slight tightening between the wall of the cup $c$ and the plate or piston.

The plate or piston $e$, provided with said silken bolting-cloth and said, packing prevents, first, the pulverized coffee from passing into the upper portion and coloring the water, which remains absolutely clear; second, the tightening by means of the packing-ring allows of lowering or raising at will the plate or piston with rod, which remains fixedly in the place where it was stopped; third, it allows by lowering the plate or piston of hindering the too-rapid filtration at the beginning, and by raising said plate or piston it hastens the filtration. A closing plate or lid $m$, made of glass and having notches $n$, is arranged above the piston. The plate $m$ is provided with a central aperture, through which the rod $j$ freely passes. Notches $n$ are provided in the plate and correspond to the two projections $o$ of the vessel $b$. The plate $m$ fits loosely, so that the water can pass around the circular edge of said plate.

A lid $p$ can be set, if desired, on the receiver $b$ to avoid the too-rapid cooling of the water contained therein.

The apparatus such as described operates as follows: The powdered coffee is placed upon the bottom of the vessel or receptacle $b$. The piston $e$ and then the plate $m$ are placed in position. The boiling water is then poured into the vessel $b$, which is afterward covered by the lid $p$ to avoid the too-rapid cooling of the water. The boiling water passes through the notches $n$ and through the space left between the circular edge of the plate $m$ and the vessel $b$, then through the perforations $i$ of the piston, and wets the coffee sufficiently to cause it to swell and prevent any further flowing of the water. After a short while it is sufficient to raise the piston $e$ for obtaining the filtration, which can be regulated at will by more or less frequent raising of the plate or piston.

As the manufacture of the vessel $b$ with projections $o$ is somewhat difficult, I have devised another arrangement, as shown in Fig. 4. In this case the projections $o$ are omitted and the plate $m$ rests simply on its seat. Around the rod $j$ is a glass tube $q$, somewhat shorter than the rod $j$ and resting on the inner edge of the plate $m$. The operation of the apparatus is the same as in the first device, except that in raising this rod and the plate $e$ it is necessary to maintain with the free hand the plate $m$ by means of said tube $q$.

What I claim, and desire to secure by Letters Patent, is—

1. A coffee-filter comprising a vessel having a reticulated bottom, a piston arranged within said vessel and forming a close joint with the inner wall of the latter, said piston being provided with a series of perforations, and a plate removably seated within the vessel above the piston and provided with an aperture and a stem on the piston projecting loosely through said aperture of the plate.

2. A coffee-filter comprising a vessel having an upper tapered portion for receiving hot water, and a lower annular portion for receiving the powdered coffee, the said lower portion having a reticulated bottom, a piston arranged within the said annular portion and forming a close joint with the inner wall of the same, said piston being provided with a series of perforations, and a plate removably seated in the tapered portion of the vessel above the piston and provided with an aperture, and a stem on the piston projecting loosely through said aperture.

3. A coffee-filter comprising a vessel having a slitted bottom, a filtering-plate arranged above said slitted bottom, a piston arranged within said vessel and forming a close joint with the inner wall of the latter, said piston being provided with a series of apertures, a filtering-cloth arranged below said apertures, a plate removably seated in the tapered portion of the vessel above the piston and provided with an aperture and a stem on the piston passing loosely through said aperture.

In testimony that I claim the foregoing I have hereunto set my hand this 11th day of May, 1901.

RAYMOND AUBRY.

Witnesses:
 EUGÈNE IMPRY,
 EMILE SIRURGUET.